INVENTOR
HEINZ DAAB,
KARL-HEINZ MEIER
ATTORNEY

FIG.5.

3,532,953
ELECTRICAL DRIVE FOR CONTROLLING SPEED
AND STOP POSITIONS OF A MACHINE SHAFT
Heinz Daab and Karl-Heinz Meier, Darmstadt, Germany,
  assignors to Quick-Rotan Becker & Notz KG., Darmstadt, Germany
Filed Aug. 14, 1969, Ser. No. 850,166
Claims priority, application Germany, Aug. 23, 1968,
1,763,853
Int. Cl. G05b 5/01
U.S. Cl. 318—467                                    14 Claims

ABSTRACT OF THE DISCLOSURE

An electrically controlled drive for normally operating a machine drive shaft at a preselected speed. Magnetic transducers are mounted to the shaft at preselected angular positions. A Hall effect oscillator senses the rotation of the transducers and solid state circuitry coupled to the oscillator controls halting of the machine shaft at the angular positions thus permitting operation of auxiliary devices.

BACKGROUND OF THE INVENTION

Field of the invention

The invention involves an electrical drive for rotating a machine shaft at a specified angular velocity and halting the machine shaft at a specified angle.

Description of the prior art

Drives of this type are installed with machine tools, spring and brush-winding machines, capacitor-winding machines, coil-winding machines, and many types of industrial sewing machines. Their special importance lies in braking and halting the machine shaft quickly and precisely, i.e., with superior control characteristics measureable by the reciprocal of the product of halting error and braking time. Sturdiness and superior reliability are essential. The known drives are unsatisfactory in this respect. One example of such drives is described in Pats. Nos. 3,160,128 and 3,253,561, in which the machine shaft brakes to a specified point from a high angular velocity to a halt, then accelerates once more and rotates at a lower speed until a synchronizer goes into action and operates a relay chain for final disconnection. Thus, stoppage at the desired point is necessarily delayed. The braking accuracy also leaves a great deal to be desired and the attainable control efficiency is very poor.

Another known drive brakes down, by means of an angular velocity error detector, to a specified speed rather than zero and then achieves final switch-off through a latch relay operated by a synchronizer, resulting in a much more efficient control. However, the release time of the relay still limits the control efficiency.

SUMMARY OF THE INVENTION

In accordance with the invention, the control efficiency can be further improved over the prior art through a drive associated with an electronic control system which alternately effects coupling and braking by load-independent maintenance of a desired velocity. A first bistable electronic switch is connected between the synchronizer and the control system. In a first stable operating state, the switch releases, by means of a short synchronizing signal, the control input for a signal from an angular velocity measuring unit, and connects the control system, in a second operating state, to brake the machine shaft to a halt. The switch is released from the control system for connection from the first to the second stable operating state as soon as a specified switch-off angular velocity is attained. Bistable electronic switches act with practically no delay on extremely short-duration signals. Such stages can be arranged so that a very small machine shaft rotation, even a fraction of an angle, will produce a corresponding control signal for the synchronizer. When the phase relation between this control pulse and the desired speed setting coincides with the braking distance required to bring the machine shaft to a halt from the predetermined switch-off velocity, the stopping error will itself be a minimum with relatively higher switch-off velocity and consequently lesser switch-off time. The mechanical contacts of a relay used in the known drives are avoided.

To obtain the switch-off velocity and release the first bistable electronic switch, a second bistable electronic switch is provided to operate when the control system effects recoupling at angular velocities above the switch-off level in braking. In that way, the switch-off velocity can be obtained with better accuracy and reliability, thus improving the efficiency of the control.

For selective adjustment of the normal speed of the machine shaft, a desired speed setting device in the form of a transformer with a variable coupling factor is connected between the control system input and the velocity measuring unit. A device of this type avoids the damage-prone slide contacts provided in the known drives of the patents described above.

It is also advisable to keep the synchronizer contactless, i.e., to use a photocell arrangement for operation with an aperture on the machine shaft, or a magnet mounted to the shaft. A synchronizer with a Hall-effect oscillator and at least one permanent magnet movable with respect to it, depending on the angular position of the machine shaft, is especially trouble-proof.

It is advantageous to give the synchronizer two switch-off positions by means of a third bistable electronic switch. For example, in a sewing-machine drive, it would be possible to hold the needle in the upper or lower position, as desired.

As a further modification of the invention, a differentiating circuit permitting only the leading edge of the synchronizing pulse to operate on the first part of the switch is connected between the synchronizer and that first bistable electronic switch. Thus, the command for the first bistable electronic switch is always applied at a precisely specified moment.

It is advisable to provide a timing device which automatically releases the brake after a predetermined interval when braking to a halt is accomplished.

In a further modification of the invention, a controlled timing circuit is provided for the second bistable electronic switch which delays the operation of the synchronizer signal on the input to the first bistable electronic switch for a specified time after operation of the second switch thereby assuring that the switch-off velocity is maintained for a specified small time interval before the switch-off command is made. As a result, a variation in the control circuit cannot affect the accuracy of the final switch-off.

It is also advisable to have a switching delay device which, when the supply voltage is switched on, holds the bistable electronic switches in one of the two stable operating states for a specified time interval, and a switching arrangement which delays undesired effects of the control system when the voltage is switched off. This will ensure that the drive will be unaffected by transients caused by supply voltage switching.

Transition from one switch-off position to a second can be simply effected if the bistable electronic switches are connected such that the machine shaft is automatically brought from the first to the second switch-off position by a third switch. To eliminate faulty operation, care should be taken that the third bistable electronic switch disables the desired speed setting element and offers the control system a fixed angular velocity in going from one switch-off position to the other.

In a further modification of the invention, additional electronic switching stages are provided for contactless operation of auxiliary devices depending on the attainment of the switch-off position or positions. To insure flawless operation, logic circuits which make the operation of the auxiliary devices dependent on the satisfaction of certain conditions are connected to the switching stages. Another switching stage can be provided to delay random effects on the drive during the operation of at least one of the auxiliary devices.

In the following, the invention is explained, together with the drawings, by way of example only, in connection with a sewing machine; it should be understood, however, that the new drive is just as well suited for many other applications. With the auxiliary devices, it can be used with other equipment, such as transport equipment, machine tools, and the like, such as in the thread-puller and thread-cutter examples here given.

BRIEF DESCRIPTION OF THE DRAWINGS

The following are shown.

DESCRIPTION OF EXEMPLARY EMBODIMENTS

Figure 1:
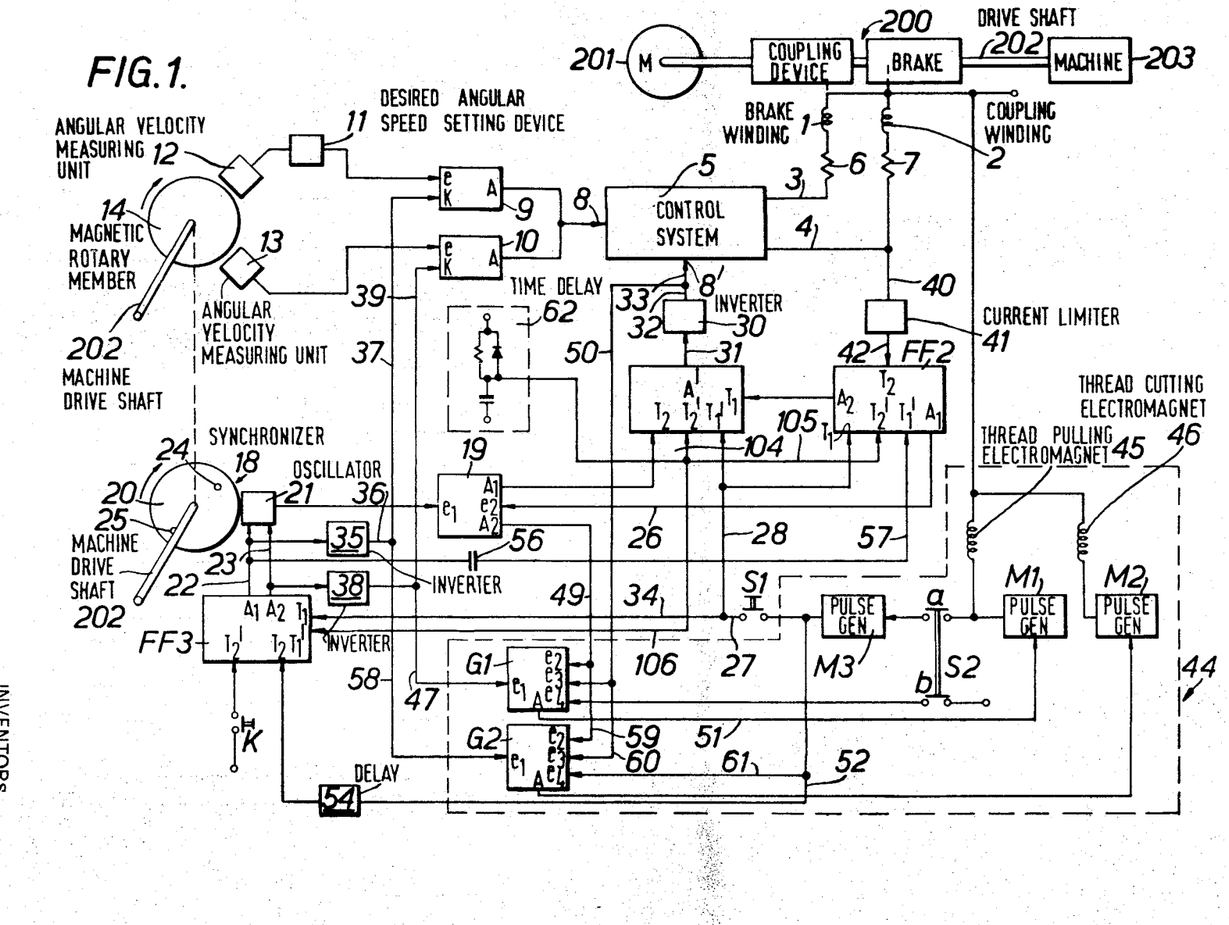
FIG. 1 is a block diagram of the invented drive.

In the block diagram of FIG. 1, the brake winding 1 of the coupling-brake assembly 200 and the coupling winding 2 are shown. The assembly is interposed between a driving motor 201 and drive shaft 202 of machine 203. The voltage from outputs 3 and 4 are applied through resistors 6 and 7 to the brake and coupling windings 1 and 2 from the control system 5. Input signals are applied to the input 8 of the control system 5 alternately from the control electronic switches 9 and 10. Each of these switches has two inputs e and K. They are arranged such that a signal at e can get through to output A if the input K is given a specified potential; ground potential, for example. If a second specified potential, one of +12 v., for example, is applied to the input K, the connection between input e and output A in switches 9 and 10 is blocked.

Input e of the electronic switch 9 is connected through the desired speed setting device 11, used as a variable voltage attenuator, to the fixed angular velocity measuring unit 12, while the input e of switch 10 is joined directly to the second fixed velocity measuring unit 13. The measuring units 12 and 13 operate together with the rotary member 14, which is mechanically coupled to the drive shaft of the coupling motor and is mounted on the drive shaft. The member 14 may be a permanent magnet disc with a surface alternately polarized north and south. In that case, the velocity measuring units 12 and 13 are coils wound around magnetic cores; a voltage is induced in these coils whose amplitude and frequency are dependent on and essentially proportional to the angular velocity of the coupling drive shaft. It is understood that each of the measuring units 12 and 13 may be assigned its own rotary member 14. It may, for example, involve permanent magnetic discs with variable members of poles.

Electronic switch 9 is normally open while 10 is blocked, so that the output signal of the velocity measuring unit 12, modified by the desired angular speed setting device 11, is input to control system 5. The output signal of device 11 is then compared by control system 5 with two previously adjusted reference voltages. If the signal is greater than the higher of the reference voltages, a voltage is applied by the control system 5 to the braking winding. If the output signal of the standard angular velocity device 11 is smaller than the other, lower reference voltage, the coupling winding is excited. In this way, by alternate operation of the brake winding and coupling winding, an angular velocity independent of the load can be maintained by the device 11.

A transformer with an adjustable coupling factor between primary and secondary windings is advantageously used as a desired speed setting device. A device of this sort is described in detail in copending application U.S. patent application Ser. No. 838,931, filed July 3, 1969. The primary winding is connected to angular velocity measuring unit 12, the secondary winding being connected to the input e of electronic switch 9.

The control system 5 is best constructed in accordance with circuitry described in copending application 842,922 field July 18, 1969.

The invention has the function of affecting the control system 5 such that a machine shaft driven by a motor comes to a halt in one of two angular positions. To achieve this, the invention includes a synchronizer 18, an amplifier 19, and three gated flip-flops FF1, FF2, and FF3. Each flip-flop has four inputs T1, T1', T2, T2' and two outputs A1, A2, with only the output A1 used in flip-flop FF1. The flip-flops are designed so that they can be switched to a first state by signals at input T1 or T1', and to a second state by signals at input T2 or T2'. In the first state, the output A1 of a switched flip-flop is at a first potential, at ground, for example, and output A2 is at a second potential, negative, for example. In the second state, the flip-flop is switched back again and the first potential appears at output A2 and the second potential at output A1.

The synchronizer 18 typically has a disc body 20 which rotates with the machine drive shaft, and a fixed element 21. Element 21 produces a pulse when the rotating element 20 takes one of two predetermined angular positions with respect to the fixed element 21. These two positions are termed, in what follows, "upper" and "lower." They correspond, for example, to the highest and lowest position of a sewing-machine needle. The flip-flop FF3 determines which of the two positions is to be maintained through its connection with element 21 over conductors 22 and 23. The fixed element 21 is a Hall-effect oscillator which produces a pulse each time two diametrically oppositely placed poled permanent magnets 24 and 25, in the rotating element 20, pass by. The polarity condition of the Hall oscillator determines which of these pulses controls shaft positioning.

Amplifier 19 has two inputs e1 and e2 as well as two ouputs A1 and A2. Input e1 is connected to the output of the Hall oscillator 21 while input e2 is connected to output A1 of the flip-flop FF2 through conductor 26. For signals applied to input e1, the output at A1 is shaped to be proportional to the differentiated input while the output at A2 of amplifier 19 is a simple proportion of the input signal.

The switch S1 is closed to start the drive and pulses are provided by a monostable multivibrator as explained hereinafter. Then the inputs T1' and T1 of flip-flops FF1 and FF2 respectively are switched in through conductors 27 and 28. Control system 5 is actuated through a signal path including an inverter-amplifier 30 connected to the output A1 of flip-flop FF1 by conductor 31. The connecting leads 32 and 33 provide continuity between inverter 30 and the control system input 8'. At the same time, switch S1 makes the connection to input T1 of flip-flop FF3 through conductors 27 and 34. The switched-in flip-flop FF3, through its outputs A1 and A2, sets the Hall oscillator for the "lower" position and closes electronic switch 9 controlled through the inverter-amplifier 35 which is connected to the output A1 of the flip-flop FF3 by conductors 36 and 37. The negative signal generated at the output A2 of the switched-in flip-flop FF3 cuts off electronic switch 10 through a second inverter-amplifier 38 connected thereto by conductor 39. The driving motor begins to operate the machine because system 5 energizes coupling winding 2. The angular velocity of the drive shaft is set by the device 11 and is maintained by control system 5 through alternating energization of coupling winding 2 and brake winding 1.

It is best to have switch S1 and the desired angular speed setting device 11 ganged, by means of a foot pedal, for example, for simultaneous operation such that switch S1 is closed with the pedal and remains closed when the pedal is kept firmly down, in order to shift device 11 to increased velocity. Switch S1 opens when the pedal is released, and device 11 then adjusts to a lower set velocity, the so-called switch-off velocity, succeeded by machine shaft stoppage at a specified angular position.

When the foot pedal is released, a high voltage is applied to input 8 of control system 5. The brake winding 1 is switched in and the coupling winding 2 is switched out by means of the control system. The machine shaft is quickly slowed down to the switch-off velocity.

As soon as the switch-off velocity is attained, control system 5 switches the brake winding 1 off and the coupling winding on. Then, flip-flop FF2 is triggered at input T2 via conductor 40, a voltage limiter 41, and conductor 42 for resetting flip-flop FF1 with a signal from output A2 to input T1. The leading edge of the next synchronizing pulse to input $e1$ of the amplifier 19 produces at the output A1 of amplifier 19 a very narrow (spiked) pulse which switches flip-flop FF1 back through input T2. Brake winding 1 is switched in through inverter-amplifier 30 and control system 5. The machine shaft is brought to a halt at a position corresponding to the "lower" position.

If the "upper" rather than the "lower" position is to be effected, the synchronizer is reversed in polarity through operation of switch K which applies a state reversing pulse to input T2' of flip-flop FF3, independently of the foot pedal.

It may sometimes be desired, in the foregoing type of operation, to use supplementary attachments at the stopping points specified by the position setting. For example, in a sewing-machine drive, it may involve a thread-cutter, by means of which a thread is pulled into the machine at the "lower" needle position and is then cut off in the "upper" position at the end of the sewing run. Numeral 44 denotes an automatic control for such an auxiliary attachment, particularly a thread-cutter. It consists essentially of three pulse generators or monostable multivibrators M1, M2, and M3, two AND gates G1 and G2, a switch S2 with contacts $a$ and $b$, and a thread-pulling electromagnet 45 as well as a thread-cutting electromagnet 46.

To operate control section 44, switch S2 is brought from its resting position, shown in FIG. 1, to its operating position where contact $a$ is closed and contact $b$ is opened, by means, for example, of a backward step on the foot pedal used to operate the desired angular velocity device 11 and switch S1, for example. Contact $b$ disconnects AND gate G1 at input $e4$. An output signal appears at the output A of AND gate G1 when the following conditions are fulfilled. Flip-flop FF3 is switched—i.e., connected to the "lower" position—such that a corresponding signal is applied to input $e1$ of AND gate G1 through conductor 47; the "lower" position is reached—i.e., a signal appears at the output A2 of amplifier 19 which is fed back to input $e2$ of the AND gate G1 through conductor 49 and the drive stands still which shows that the flip-flop FF1 is switched back to produce a signal through inverter-amplifier 30, conductor 32, and conductor 50 to input $e3$ of the AND gate G1.

The signal at the output A of the AND gate G1 triggers monostable M1 through conductor 51 and the thread-pulling electromagnet 45 is excited by a resultant pulse.

Contact $a$ of switch S2 connects the output of monostable M1 with the input of monostable M3 which, as hereinafter explained in detail, disables switch S1. Thus, the possible result that the needle might be caught and broken on the blade of the thread-cutter, for example, if the drive is mistakenly switched in with S1 during the thread cutting, will be prevented. The flip-flop FF3 is switched back by a pulse from monostable M3 and fed through conductor 52 and the time delay unit 54 to the flip-flop input T2. Synchronizer 18 rotates to a reversed position and the electronic switch 9 is blocked while switch 10 is opened through inverter-amplifiers 35 and 38. The conductive condition of switch 10 causes the angular velocity measuring unit 13, which is independent of the desired speed setting device 11, is made operative. Device 11 no longer has any effect on the control system, so that an unintentional adjustment of the device will not have any deleterious effect on a thread-cutting process.

With the resetting of flip-flop FF3, flip-flop FF2 is switched through capacitor 56 and conductor 57 to input T1'. In its turn, flip-flop FF2 switches flip-flop FF1 through output A2, FF1 releasing the control system 5 through output point A1 and the inverter-amplifier 30. The machine shaft runs at a lower angular velocity, dependent on the angular velocity measuring unit 13, from the "lower" to the "upper" position setting.

As soon as the "upper" position is attained, an output signal appears at point A of the AND gate G2 on the basis of the following conditions: The flip-flop FF3 is reset, at which a signal is brought to the input $e1$ of the gate G2 through inverter-amplifier 35 and conductor 58; the position setting "upper" is attained, so that a signal is brought from output A2 of amplifier 19 through conductors 49 and 59 to input $e2$ of the AND gate G2; the driving motor is braked to a stop—i.e., flip-flop FF1 is reset and a signal is input to terminals $e3$ of G1 and G2 through conductors 50 and 60. During this interval, monostable M3 has not as yet reverted to its quiescent condition, so that a signal is applied to input $e4$ of G2 through conductor 61.

The output signal of the AND gate G2 triggers monostable M2, which in turn excites the thread-cutting magnet 46. The delay unit 62 prevents, in a way more clearly seen in connection with FIGS. 2 to 5, arbitrary variations of the drive when the supply voltage is switched on through a network that is not shown.

Figure 3:
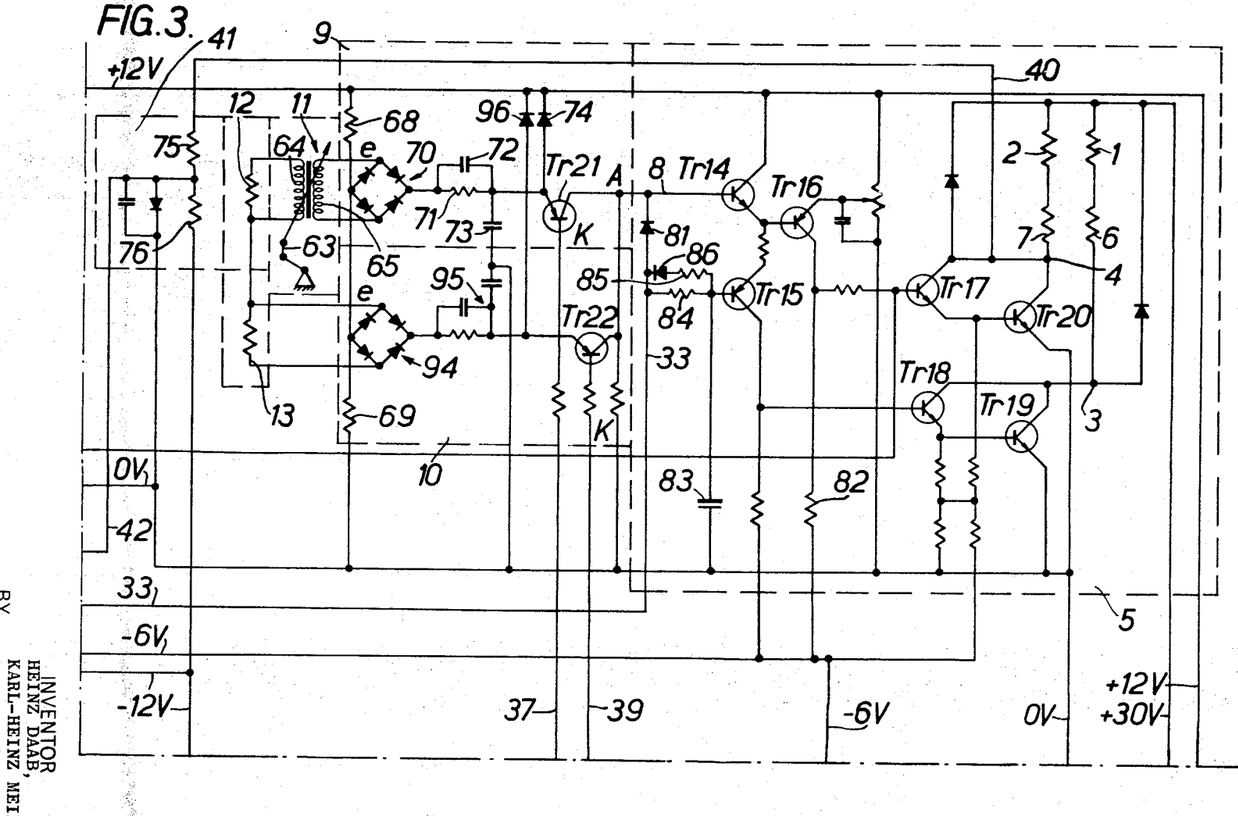
FIG. 3 is a circuit diagram illustrating the upper right quarter section of the block diagram in detail.
Figure 4:
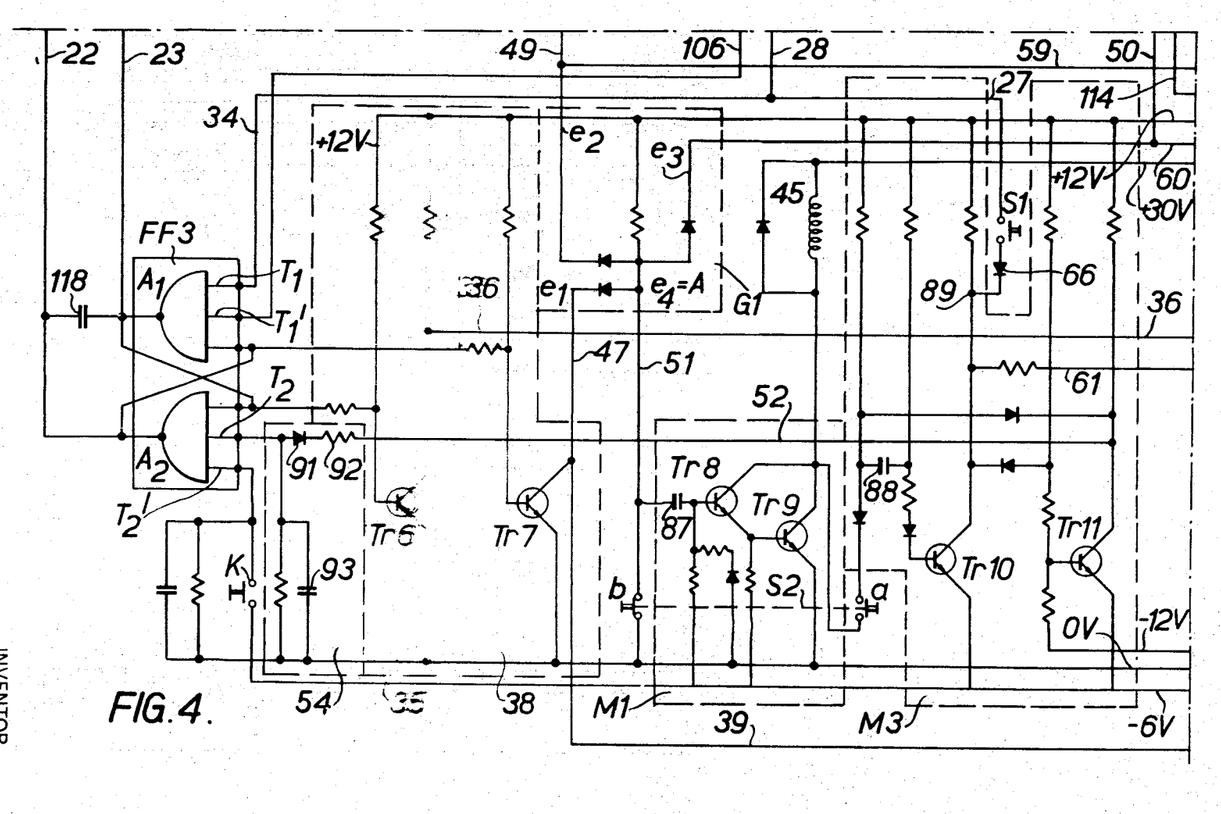
FIG. 4 is a circuit diagram illustrating the lower left quarter section of the block diagram in detail.
Figure 5:
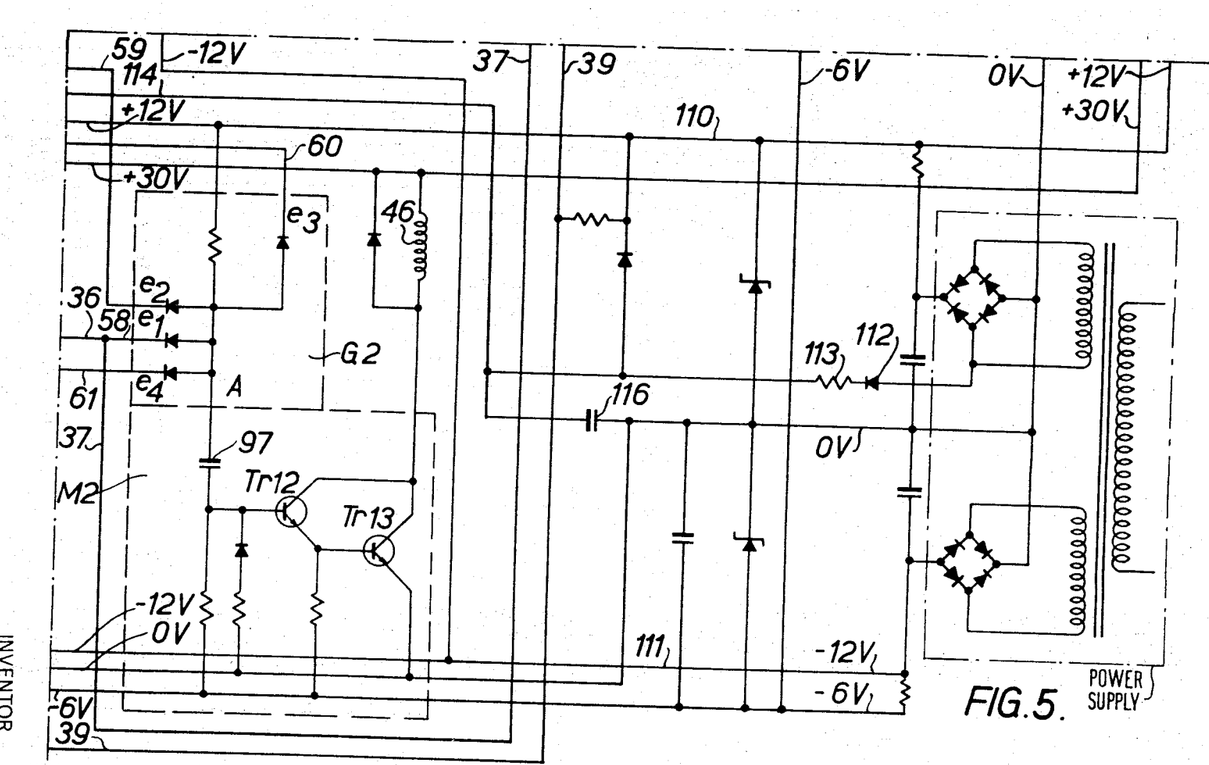
FIG. 5 is a circuit diagram illustrating the lower right section of the block diagram in detail.

To make comparison simpler, the functional blocks of FIG. 1 are marked by the dashed lines in the assembly drawings of FIGS. 2 to 5 and with the same reference symbols. The power supply is also shown in FIG. 5.

The essential details of the structure of the whole assembly are given in the following functional description.

Figure 2:
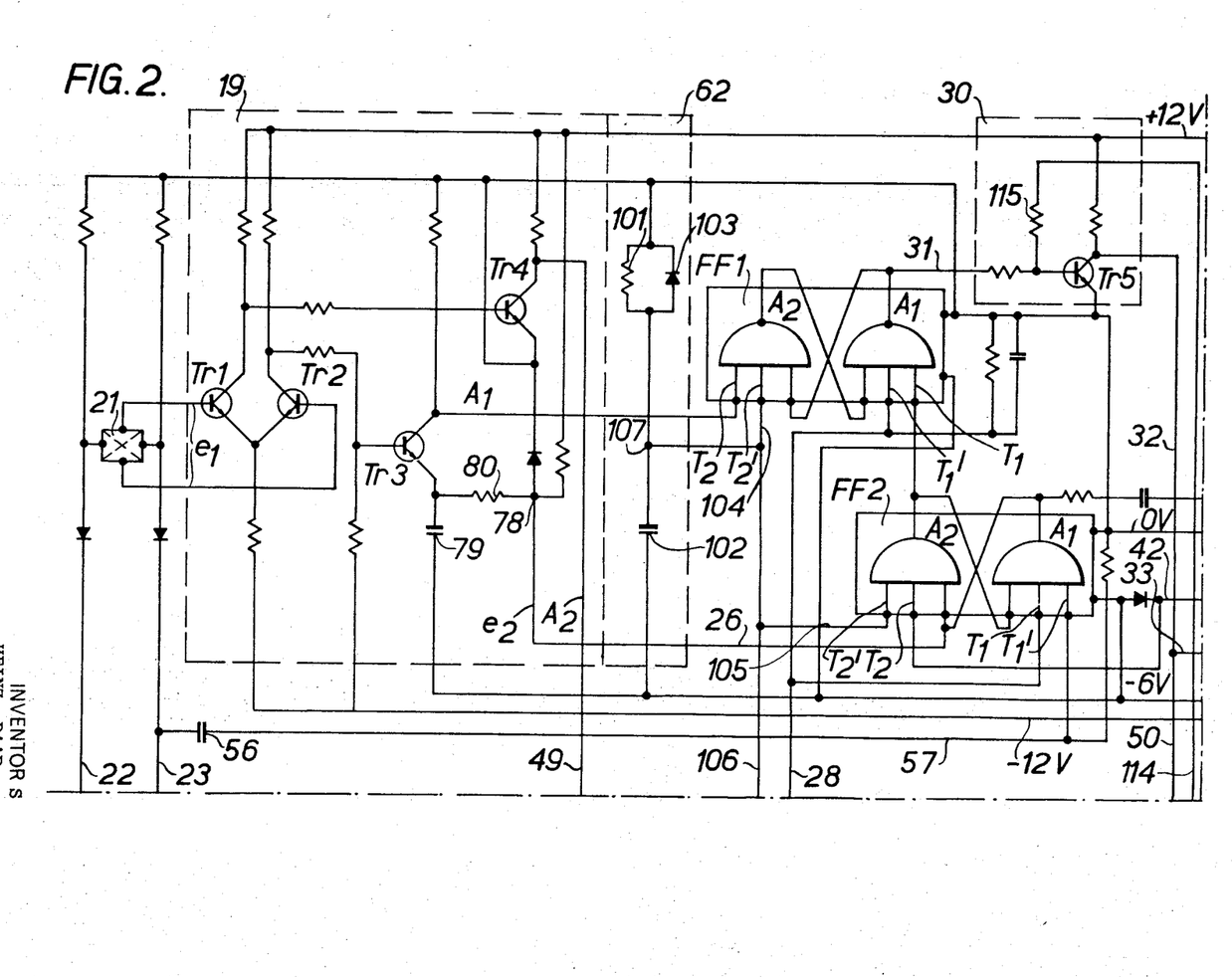
FIG. 2 is a circuit diagram illustrating the upper left quarter section of the block diagram in detail.

The drive is switched in when foot pedal 63 (FIG. 3) is pressed forward. Then, switch S1 (FIG. 4) is closed. In addition, the primary and secondary windings 64 and 65 respectively of the transformer, shown as desired speed setting device 11 (FIG. 3), will be shifted with respect to each other such that the coupling factor of the two windings is reduced by an amount depending on the placement of the foot pedal. One component, transistor $Tr10$ (FIG. 4) of monostable M3 is normally switched such that continuity is achieved through the emitter-collector circuit of this transistor, a diode 66, the closed switch S1, and conductors 27, 28, and 34, resulting in a negative potential (about $-6$ v.) being applied to the input T1' of flip-flop FF3. All three flip-flops are switched so that the output A1 of flip-flop FF1 is at a potential of 0 v. Referring to FIG. 2, transistor $Tr5$ conducts. The collector of transistor $Tr5$ goes to 0 v., and as a result control system 5 (FIG. 3) is disconnected through conductors 32 and 33, FIG. 2.

Since the output A1 of flip-flop FF3 is at 0 v., as seen in FIG. 4, transistor $Tr6$ of inverter-amplifier 35 conducts. A ground potential is applied through conductors 36 and 37 to the base of transistor $Tr21$ of the electronic switch 9 as illustrated in FIG. 3. Switch 9 then conducts. Viewing FIG. 4, at the same time, a −6 v. potential is applied from the output A2 of the flip-flop FF3 to the base of transistor Tr7 of inverter-amplifier 38. Transistor Tr7 is blocked. A +12 v. potential is applied through conductor 39 to input K of electronic switch 10, i.e., to the base of transistor Tr22 (FIG. 3). Switch 10 is blocked. As a result, the angular velocity measuring unit 13 is disabled and the connection between angular velocity measuring unit 12 and the input of control system 5 is made.

Referring to FIG. 3, since the angular velocity of the machine drive shaft is initially zero, angular velocity measuring unit 12 produces no voltage. Only the bias voltage for the rectifier bridge 70 connected to the desired speed setting device 11, obtained from resistors 68 and 69 and minus the voltage drop of the bridge, is applied to input 8 of control system 5. Controlled through transistor Tr14, transistor Tr16 in turn controls transistors Tr17 and Tr20. A current flows through resistor 7 and coupling winding 2. Transistors Tr18 and Tr19, connected to the brake winding 1, are blocked by transistor Tr15. As a result, no current can flow through brake winding 1. This means that coupling is operative and that the drive shaft is coupled with the idling driving motor shaft. The drive shaft begins to rotate. Since the coupling winding 2 remains energized during this run, the angular velocity of the drive shaft and the output voltage of the angular velocity measuring unit 12 rise quickly.

The rectifier bridge 70 converts the output signal of the speed setting device 11 to a pulsating D-C voltage. The circuit following rectifier bridge 70, consisting of resistor 71 and capacitors 72 and 73, converts this pulsating voltage to a D-C voltage with a superposed alternating voltage. The rise in angular velocity lasts until the superposed alternating voltage, applied to the base of transistor Tr14 reaches a value at which transistors Tr18 and Tr19, controlled by Tr15, operate to apply a voltage to the brake winding 1. The braking current takes on a predetermined value for this angular velocity. Transistors Tr17 and Tr20 are controlled by transistor Tr16 to the point where the coupling current value is such that the coupling duration is exactly sufficient to keep the angular velocity at its predetermined level. The coupling and braking are made to operate alternately to keep the adjusted standard angular velocity independent of the load. The explanation given so far for the operation of control system 5 should be adequate; further details are provided in copending application.

Diode 74 limits the emitter potential of transistor Tr21 to +12 v. This prevents excessive current flow through transistor Tr21.

It will be assumed, in what follows, that the drive stays in the "lower" position with higher angular velocity. To do that, the foot pedal 63 is released, and the coupling factor between the primary winding 64 and the secondary winding 65 of the device 11 is brought to its maximum value. The drive shaft of the motor still has a high angular velocity. As a result, there is a high voltage at the output of device 11 and across the rectifier bridge 70. A high positive voltage is brought to input 8 of control system 5. Then, transistors Tr15, Tr18, and Tr19 are triggered by Tr14. The brake is switched in and transistor Tr16 is blocked. As a result, transistors Tr17 and Tr20 are also blocked and the coupling winding is deenergized. A high positive potential (about +30 v.) appears at the collector of transistor Tr20. When pedal 63 is returned to the resting position, switch S1 opens. The flip-flops FF1 and FF2 are cut off at inputs T1' respectively since the −6 v. potential is disconnected from these inputs.

As soon as the coupling motor drive shaft is braked to the lower switch-off velocity set by the device 11 in its resting position, and this velocity drops, control system 5 once again applies a voltage to the coupling winding 2.

As a result, the collector potential of transistor Tr20 drops from +30 to 0 v. The ground potential is applied through conductor 40 to one terminal of the voltage divider, consisting of resistors 75 and 76, in the voltage limiter 41. The other terminal of voltage divider 75 and 76 is connected to the −12 v. bias bus. A −6 v. potential, which resets flip-flop FF2, appears on conductor 42 between the junction point of resistors 75 and 76, and the input T2 of flip-flop FF2. The output A2 of flip-flop FF2 goes to ground potential and switches out flip-flop FF1 at input T1.

Referring to FIG. 2, output A1 of flip-flop FF2 is at −6 v. This potential is transferred through conductor 26 to point 78. Capacitor 79, which had charged up while flip-flop FF2 was reaching the −6 v. level, begins to discharge through resistor 80. After a time period determined by the time constant of the RC combination of capacitor 79 and resistor 80, transistor Tr3 of amplifier 19 is switched out. As a result, a positioning pulse from the synchronizer can now become operative when the angular velocity is not only reached but maintained for a period determined by the values of the RC combination of 79 and 80. In this way, final switch-off during a possible buildup of the control system, which would impair the accuracy of the stop, is prevented.

If the permanent magnets 24 and 25 shown in FIG. 1 and assigned to the "lower" position pass Hall oscillator 21, a +12 v. pulse appears at the collector of transistor Tr2, in the differential amplifier shown in FIG. 2 and made up of transistors Tr1 and Tr2, which control transistors Tr3. Because of capacitor 79 in the emitter circuit of transistor Tr3, a capacitor-charging current immediately flows in the emitter-collector circuit of Tr3 which is large enough to bring the collector potential of Tr3 to a sufficiently negative level to reset flip-flop FF1. This means that the Hall oscillator pulse is differentiated; the leading edge of the pulse becomes spiked, the pulse taken off the collector of transisor Tr3 has a width corresponding to only a fraction of a degree of rotation of the synchronizer member 20 and consequently of the machine shaft. This spiked pulse resets flip-flop FF1 at input T2. The potential at the output A1 of the flip-flop FF1 switches from 0 to −6 v. Transistor Tr5 is blocked through conductor 31 so that a potential of +12 v. appears at the collector of transistor Tr5.

Referring to FIG. 3, the base of transistor Tr14 is biased at 12 v. by conductors 32 and 33, and the diode 81. Transistor Tr14 blocks. A positive potential minus the voltage drop across transistor Tr14, appearing on conductor 33, appears also at the base of transistor Tr16. The base of Tr16 then becomes more positive than the emitter of this transistor, and Tr16 blocks. Through resistor 82, the base of transistor Tr17 acquires a potential of −6 v. Transistors Tr17 and Tr20 block; coupling winding 2 is deprived of current.

As long as flip-flop FF1 remains switched and a potential of 0 v. is on conductor 33, capacitor 83 in the base circuit of transistor Tr15 is still charged. With a change of the potential of conductor 33 to +12 v., the potential on the base of transistor Tr14 rises correspondingly coupled. Transistor Tr15 is opened as a result. The base potential of transistor Tr18 becomes more positive. Transistor Tr18 and transistor Tr19 conduct. The brake winding 1 is energized. Capacitor 83 slowly charges through resistor 84. The difference between the emitter and base potentials of transistor Tr15 drops correspondingly. As soon as the emitter-base voltage becomes 0, transistor Tr15 blocks. The collector potential goes to −6 v.; transistors Tr18 and Tr19 conduct. After the switch-off pulse of transistor Tr3, transistors Tr18 and Tr19 had been conducting for a time determined by the time constant of RC circuit 83 and 84. Thus, after an interval in which the braking to a halt safely occurs, the brake is again switched off. Resistor 85 and diode 86 form a discharge circuit for capacitor 83 to restore the base of transistor Tr15 to 0 v. as quickly as possible when flip-flop FF1 is again switched.

The machine drive shaft is now at a standstill. Since the brake is deenergized, the shaft is free and can, if desired, be manually set.

By tapping foot pedal 63 and briefly closing switch S1, it is possible to rotate the machine shaft once from the "lower" position to the "upper" position. If the foot pedal is pressed forward only so far as to just close switch S1, flip-flops FF1, FF2, and FF3 will be switched in the manner described above. The output A1 of flip-flop FF1 switches to 0 v. Transistor Tr15 conducts. Input 8 of control system 5 is switched out through conductors 32 and 33. The bias voltage at rectifier bridge 70 controls transistors 16, 17 and 20 through transistor 14. The coupling is energized and the motor runs. When the permanent magnet of synchronizer 18 (FIG. 1) corresponding to the "lower" position pass Hall oscillator 21 after one rotation of the machine shaft, the collector of transistor Tr2 (FIG. 2) is at a potential of +12 v. Transistor Tr3 conducts. At the first moment of triggering of transistor Tr3, its collector quickly goes to −6 v. and the conduction current serves as the charging current for capacitor 79; flip-flop FF1 is reset through input T2. Then, the collector potential of transistor Tr3 immediately falls back to a value (−3 v., for example) outside the operation region of flip-flop FF1. Because of the resetting of flip-flop FF1, the brake is switched on as described above, and after a time determined by the RC circuit of 83 and 84 (FIG. 3) is again automatically switched off.

By operation of switch K (FIGS. 1 and 4), which by way of example may be in the form of a toggle switch, the drive is so controlled that the machine shaft goes from the "lower" to the "upper" position. With the closing of switch K, a potential of −6 v. is applied to the input T2' of flip-flop FF3. Flip-flop FF3 is reset. As a result, the Hall oscillator 21 switches polarity through conductors 22 and 23 so that the synchronizer operates when the magnet corresponding to the "upper" position passes by. Flip-flop FF2 is switched through output A1 of flip-flop FF3, conductor 23, capacitor 56, conductor 57, and input T1', and in turn switches flip-flop FF1 through output A2 into input T1. Output A1 of flip-flop FF1 switches to 0 v. Input 8 of control system 5 is switched out through transistor Tr5 and conductors 32 and 33. Coupling winding 2 is energized. The motor starts up. As soon as the "upper" position is reached, a positive pulse appears at the collector of transistor Tr2. The brake is activated in the manner described above. Thus, the moment switch K is closed, the machine shaft closes in on the "upper" position independently of pedal 63 and switch S1.

If foot pedal 63, previously pushed forward for the braking and stoppage at a specified point, is not only released to return to its neutral position, as was assumed above, but is pushed back through the neutral position, contact $a$ of switch S2 (FIG. 4) is closed and contact $b$ of S2 is opened. With contact $b$ open, the output of the AND gate G1 is cut off from the ground bus; i.e., it is disconnected. Contact $a$ connects the output of monostable M1 (the collectors of transistors Tr8 and Tr9) with the input of the monostable M3. The output of the AND gate G1 is normally at 0 v. It switches to +12 v. as soon as the following conditions are fulfilled after the opening of contact $a$ of switch S2:

Synchronizer 18 is conditioned for the "lower" position. Flip-flop FF3 is switched. As a result, transistor Tr7 is blocked off from output A2, at −6 v., of flip-flop FF3. The collector of transistor Tr7 is at a potential of +12 v., brought through conductor 47 to input e1 of the AND gate G1. The machine shaft has reached the "lower" position. Here, transistor Tr4 (FIG. 2), in amplifier 19 is blocked. At the output A2 of the amplifier, the collector of transistor Tr4, is at a potential of +12 v., supplied through conductor 49 to input e2 of the AND gate G1.

The drive stands still. Flip-flop FF1 is reset. A −6 v. potential is at the output A1, blocking transistor Tr5 of inverter-amplifier 30 through conductor 31. The collector of transistor Tr5 is at +12 v. This potential is transferred through conductors 32 and 50 to input e3 of the AND gate G1.

When all three conditions are fulfilled, conductor 51 (FIG. 4) will have a potential of +12 v. Capacitor 87 charges through the base of transistor Tr8 and the transistor Tr9. Both transistors Tr8 and Tr9 conduct and the thread-pulling magnet 45 is activated.

At the same time, the ground potential is applied through contact $a$ of switch S2 to capacitor 88, which is tied to the base of transistor Tr10 of the monostable M3. Capacitor 88 is charged up. The base potential of transistor Tr10 then drops. Transistor Tr10 blocks. The collector potential of transistor Tr10 rises. This means that the potential (16 v.) required to switch the flip-flop is not provided to the side of switch S1 that is connected with the collector of transistor Tr10. Thus, for the time interval determined by the charging time of capacitor 88, switch S1 is inoperative and damage to the machine through misuse is eliminated.

In addition, transistor Tr11 of the monostable oscillator M3 conducts because of the rise in collector potential of transistor Tr10. A potential of −6 v. is applied from the collector of transistor Tr11 through conductor 52 and the time delay circuit 54 with the diode 91, the resistor 92, and the capacitor 93, to input T2 of the flip-flop FF3. Flip-flop FF3 is belatedly reset—i.e., to the "upper" setting—and, in turn switches the polarity of the Hall oscillator 21 through conductors 22 and 23. The −6 v. potential at the output A1 of flip-flop FF3 blocks the transistor Tr6 of the inverter-amplifier 35. The +12 v. potential is applied from the collector of transistor Tr6 through conductors 36 and 37 to the base of transistor Tr21 (FIG. 3); in the electronic switch 9. Transistor Tr21 blocks and breaks the connection between the angular velocity measuring unit 12, speed setting device 11, and input 8 of the control system 5. On the other hand, transistor Tr7 (FIG. 4) of the inverter-amplifier 38 is independent of output A2 of the flip-flop FF3. The ground potential is applied from the collector of transistor Tr7 through conductor 39 to the base of transistor Tr22 (FIG. 3) which conducts, so that the angular velocity measuring unit 13, unaffected by the speed setting device 11, is made operative at input 8 of control system 5.

Also, a −6 v. pulse is applied to input T1' of the flip-flop FF2 (FIG. 2), from the output A1 of flip-flop FF3 through conductor 23, capacitor 56, and conductor 57. This flip-flop is switched, and a −6 v. potential appears at output A2 and brought to input T1 of flip-flop FF1. Flip-flop FF1 is switched; a potential of 0 v. appears at its output A1. Transistor Tr5 is triggered through conductor 31 and applies a ground potential to conductors 32 and 33, thus switching out input 8 of the control system 5. Bias voltage derived from the voltage divider of resistors 68 and 69, of rectifier bridge 94 following the angular velocity measuring unit 13, is fed to the emitters of transistors Tr17 and Tr20 to establish quiescent conditions. These transistors are triggered through transistors Tr14 and Tr16, while transistors Tr18 and Tr19 are blocked by controlling transistor Tr15. The coupling winding 2 is energized. The machine drive shaft is accelerated to the switch-off velocity as detected by the angular velocity measuring unit 13. The machine shaft rotates out of the "lower" position. This run is the result of the time delay circuit 54 (FIG. 4) through which the thread-pulling electromagnet 45, which is mechanically reset by means of the sewing machine shaft, has already been activated for a time sufficient to catch the thread with safety. Viewing FIG. 1, the machine shaft then runs into the "upper" position through the cooperation of the angular velocity measuring unit 13, the rectifier bridge 94, RC combination 95 corresponding to the RC combination of 71, 72 and 73, and the control system 5, with the specified switch-off velocity. Diode 96 limits the emitter potential of transistor Tr22 to +12 v.

When the appropriate one of the permanent magnets 24 and 25 reaches the Hall oscillator, transistor Tr2 (FIG. 2) conducts. The spiked pulse due to the permanent magnet appears on the collector of transistors Tr1 and Tr2 and is brought to input T2 of flip-flop FF1 to reset it. Transistor Tr5 blocks. As shown in FIG. 3, transistors Tr16, Tr17, and Tr20 are blocked through conductors 32 and 33 and the transistor Tr14, while transistors Tr15, Tr18 and Tr19 are conductive for a time interval determined by the RC combination of 83 and 84. The drive shaft is braked to a standstill and is then switched out.

Since flip-flop FF3 in FIG. 4 is switched to the "upper" position and thus reset, a +12 v. potential is obtained from the collector of the blocked transistor Tr6 and put through conductors 36 and 58 to the input e1 of the AND gate G2. With the attainment of the "upper" position, transistor Tr4 (FIG. 2) is blocked off from transistor Tr1 so that the +12 v. potential is applied to the input e2 of the AND gate G2 of FIG. 5. Along with the final switch-off command given through conductors 32 and 33 to control system 5 (FIG. 3), in the resetting of flip-flop FF1, a potential of +12 v. is applied through conductors 32, 50, and 60 to the input e3 of the AND gate G2 (FIG. 5). As long as the monostable oscillator M3 shown in FIG. 4 has not as yet returned to its resting position—i.e., as long as transistor Tr10 is blocked, the +12 v. potential is also applied through conductor 61 to the input e4 of the AND gate G2. If a +12 v. is applied in this manner to all inputs 31 to 34 of AND gate G2, its output A switches to a potential of +12 v. The capacitor 97 of FIG. 5, connected to the base of transistor Tr12 of the monostable oscillator M2 is charged up. Transistors Tr12 and Tr13 conduct for a time interval determined by the time taken to charge capacitor 97. The thread-cutting electromagnet 46 is energized; it will once again be de-energized when capacitor 97 is fully charged.

The switch-in delay 62 has a resistor 101, a capacitor 102, and a diode 103 (FIG. 2). As long as the supply voltage is switched off, no voltage appears at capacitor 102. When it is switched on, the supply voltage circuit (FIG. 5) yields the various operating voltages. Since capacitor 102 is at first uncharged, —6 v. is applied through conductors 104, 105, and 106 to inputs T2' of flip-flops FF1 and FF2 to input T1' of flip-flop FF3. Flip-flop FF1 enters a reset state, flip-flop FF2 enters the state in which the switch-off velocity is reached, and flip-flop FF3 enters the state corresponding to the "lower" position. Thus, no random pulses can appear when the power supply is switched on. Point 107 goes to 0 v., and the flip-flop inputs connected to this point are switched out only when capacitor 102 is charged up. When the power supply is switched off, capacitor 102 should discharge at least as fast as the operating voltages produced by the power supply return to 0 v. This is ensured by diode 103.

When the power supply is switched off, the +12 v. potential on bus 110 (FIG. 5) decays slower than does the —12 v. on conductor 111. If no special precautions were taken, this would have the result that the collector of transistor 5 would again be connected to 0 v. and the control system 5 could then be damaged. To prevent this, the base of transistor Tr5 is isolated through a diode 112, a resistor 113, a conductor 114 and resistor 115, with a +12 v. base bias voltage provided, which decays quickly through capacitor 116 when the power supply is switched off. Thus, random variations are also eliminated when the power supply is shut down.

A capacitor 118 (FIG. 4) short-circuits any possible high-frequency interference on the synchronizer leads 22 and 23, and thus prevents undesired triggering of flip-flop FF3.

It should be understood that the foregoing disclosure relates only to exemplary embodiments of the invention and that numerous modifications or alterations may be made therein, suitable to other embodiments, without departing from the spirit and scope of the invention.

We claim:

1. An electrically controlled drive for rotating a machine driving shaft of a preselected angular velocity and subsequently stopping the shaft at a predetermined angular position comprising a coupling-brake assembly to be driven by a motor, the assembly being interposed between the motor and the machine shaft; synchronizer means for monitoring predetermined angular positions of the shaft; an electronic control system for monitoring machine shaft velocity, the coupling-brake assembly responding to commands of the system for maintaining a substantially constant preselected shaft velocity indepentent of load; a first electronic switch connected between the synchronizer and the control system, the switch being triggered into a first state in response to actuation of the synchronizer for maintaining the control system ready to effect the substantially constant preselected shaft velocity, the switch being set to a second state in response to a predetermined switch-off angular velocity, the control system causing the coupling-brake assembly to stop the shaft when the switch transfers to the second state.

2. The drive of claim 1 together with a second electronic switch connected to the input of the first switch for causing state change of the first switch in response to a trigger signal from the second switch, the signal being generated when the control system renews coupled drive of the shaft after braking has occurred to slow the shaft from a velocity higher than the switch-off velocity.

3. The drive of claim 2 together with means connected to the drive shaft for measuring the angular velocity thereof, the means providing the control system with data to perform the monitoring function, the drive further including a transformer having a variable coupling factor connected between the control system and the velocity measuring means for setting a desired rotational shaft speed.

4. The drive defined in claim 3 wherein the synchronizer includes no mechanical contacts.

5. The drive set forth in claim 4 wherein the synchronizer includes at least one magnetic element rotatably mounted to the driving shaft, and a Hall-effect oscillator disposed adjacent the shaft for detecting the element's motion past the oscillator, indicative of a predetermined angular shaft position.

6. The drive of claim 5 together with a third electronic switch connected to the input of the synchronizer for controlling the monitoring condition thereof, and means connected to the third switch for causing actuation of the synchronizer to a new state for detecting an alternate predetermined angular position of the shaft.

7. The drive of claim 6 wherein the synchronizer emits a pulse when a predetermined angular position of the shaft is detected, and further wherein the drive includes a waveform differentiating circuit for permitting only the leading edge of the synchronizer pulse to operate on the first electronic switch, the circuit being connected between the switch and the synchronizer.

8. The drive of claim 7 together with timing means for automatically ceasing braking action of the coupling-brake assembly after the shaft has been stopped for a predetermined time interval.

9. The drive defined in claim 8 together with second timing means controlled by the second electronic switch for preventing response of the first electronic switch to the synchronizer signal for a predetermined time interval subsequent to state switching of the second electronic switch.

10. The drive of claim 9 together with delay means for maintaining the three electronic switches in a predetermined state during power turn-on thereby preventing erratic operation of the drive.

11. The drive of claim 10 together with switch means for preventing spurious effects on the control system when an associated power supply is switched off.

12. The drive of claim 11 wherein the third electronic switch disables the effect of the transformer with variable coupling on the control system, and influences the system to maintain a constant angular velocity during displacement of the shaft between the predetermined angular positions.

13. The drive of claim 12 together with auxiliary electronic switch means for rendering auxiliary devices operative depending upon respective attainment of the predetermined angular positions of the shaft.

14. The drive of claim 13 together with an additional electronic switch provided in circuit for preventing transient effects on the drive during the operation of at least one auxiliary device.

References Cited

UNITED STATES PATENTS

| | | |
|---|---|---|
| 2,287,002 | 6/1942 | Moseley. |
| 2,767,363 | 10/1956 | Chubb. |
| 3,376,486 | 4/1968 | Caputo. |

BENJAMIN DOBECK, Primary Examiner

U.S. Cl. X.R.

318—269, 362